Mar. 5, 1929.  N. M. HOPKINS  1,703,934
ELECTRIC CURRENT CONVERTER
Filed Dec. 20, 1920   2 Sheets-Sheet 1
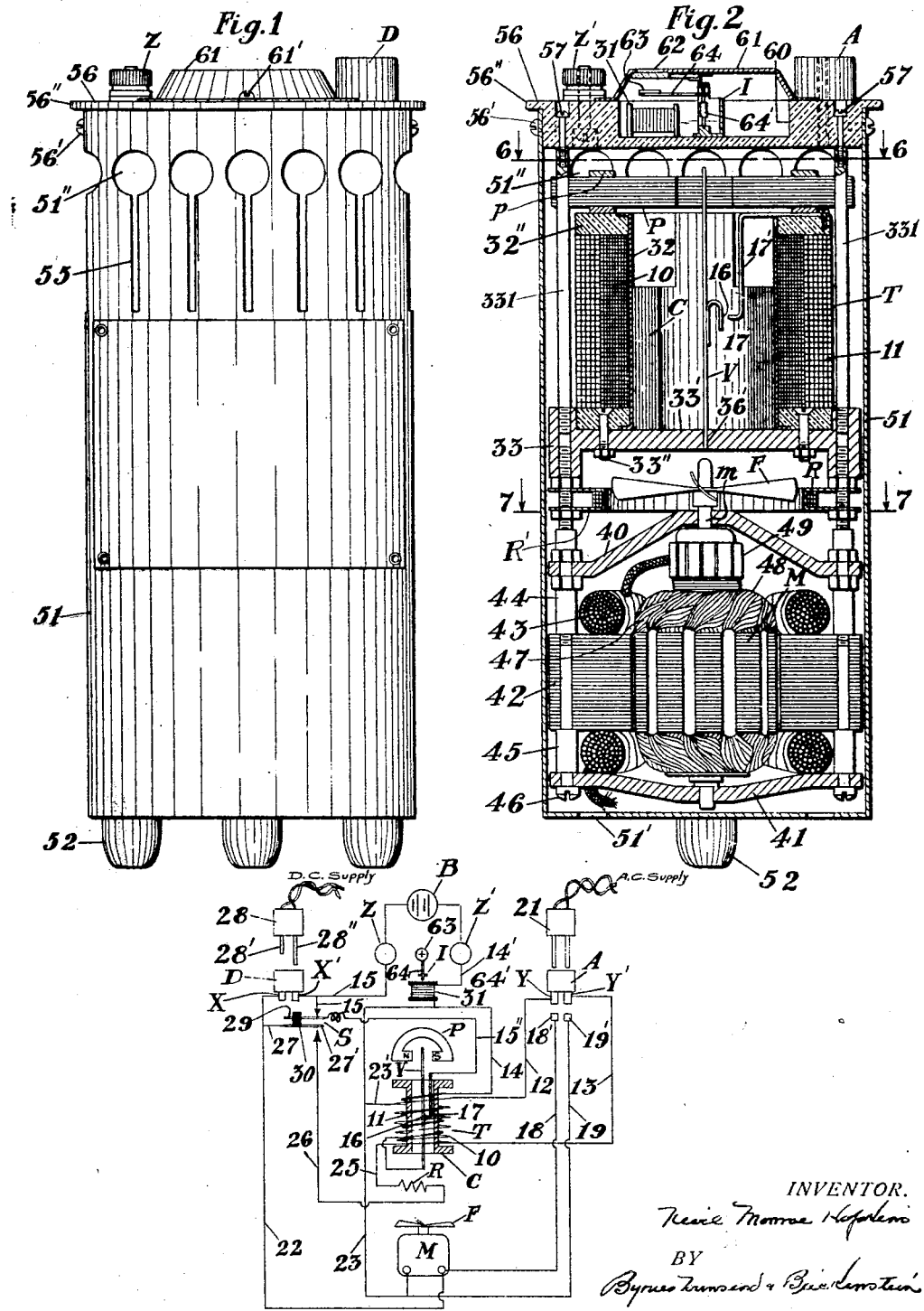

Mar. 5, 1929.  N. M. HOPKINS  1,703,934
ELECTRIC CURRENT CONVERTER
Filed Dec. 20, 1920   2 Sheets-Sheet 2
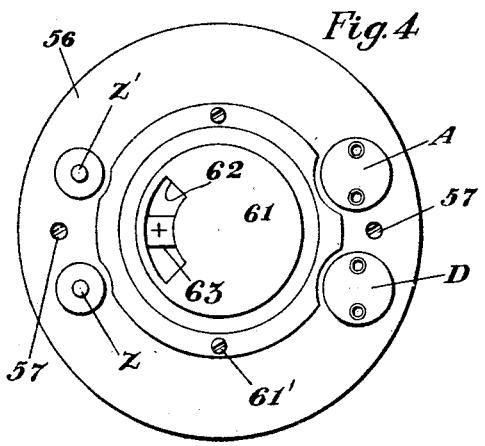
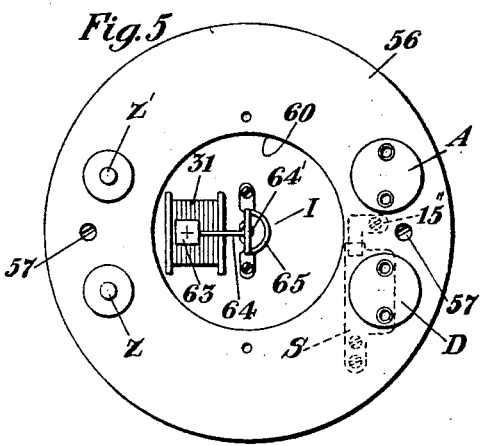
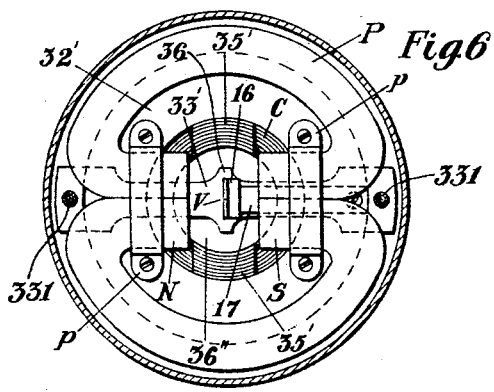
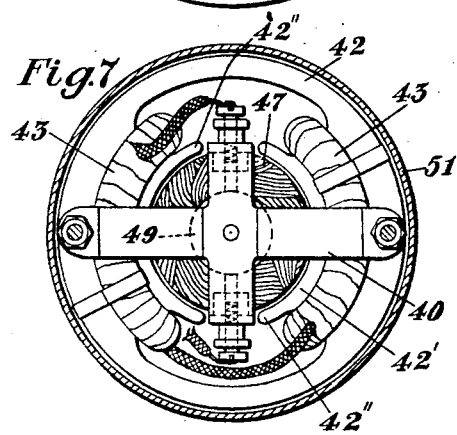
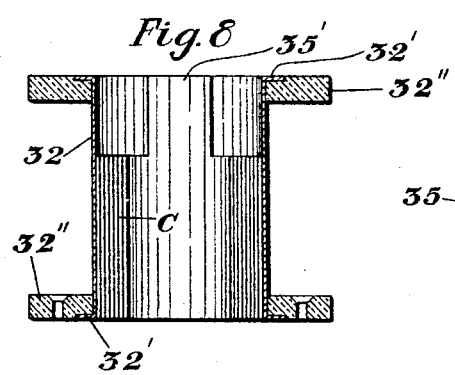
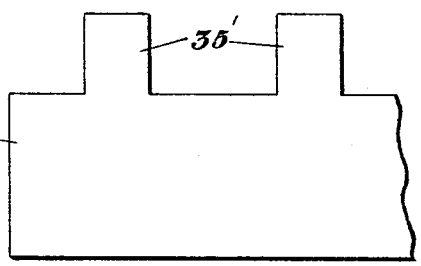
INVENTOR.
Neil Morris Hopkins
BY
ATTORNEYS Patented Mar. 5, 1929.

1,703,934

UNITED STATES PATENT OFFICE.

NEVIL MONROE HOPKINS, OF NEW YORK, N. Y., ASSIGNOR TO NATIONAL CARBON COMPANY, INC., A CORPORATION OF NEW YORK.

ELECTRIC-CURRENT CONVERTER.

Application filed December 20, 1920. Serial No. 432,020.

This invention relates to electric current converters, and particularly to portable current converting devices especially adapted for use in charging electric storage batteries, such as miniature storage batteries, employed in flashlights, hand and pocket lanterns, and similar portable electric lighting devices. It is to be understood, however, that certain features of this invention are of more general application and are not limited to the particular type of electric current converter disclosed nor to its use with miniature storage batteries.

Electric current converting devices have heretofore been constructed for use in charging vehicle storage batteries but such converting devices are not suitable nor generally intended for use in charging miniature batteries of the type above described and because of their excessive weight, it is impractical to carry them about with such batteries to permit the latter to be recharged at any time by persons unfamiliar with electrical devices and circuits. Other objectionable features of current converting devices heretofore known are their cost, the excessive heat which they develop, and the inability of such devices to operate optionally from either direct or alternating current supply circuits of relatively high potential.

The objects of the present invention are, therefore, to provide a simple and compact portable converting device that is especially adapted for use in charging flashlight storage batteries by persons who are unfamiliar with electrical circuits and devices.

A further object of the invention is to provide a portable electric current converter of the above type which is comparatively small, and inexpensive, that is, of such a size that, if desired, it may be readily carried from place to place with a flashlight, and one which may be maintained comparatively cool while it is in use.

Another object of the invention is to provide an electric current converter which may alternatively be electrically connected to either direct current or alternating current high-potential lighting circuits such as are now generally in use in residences and other buildings, so that flashlight and similar storage batteries may be readily recharged at any time and any place where electric current is available, by persons who are generally unfamiliar with electrical devices and circuits.

The above and other important objects and the novel features of this invention will be apparent from the following description taken in connection with the drawings, which constitute a part of this application, and in which Fig. 1 is a side elevational view of an electric current converter embodying my invention, Fig. 2 is a central vertical sectional view of the same, parts in the interior being shown in elevation, Fig. 3 is a diagram of the electrical connections of the parts of the converter, Fig. 4 is a top plan view of the converter, Fig. 5 is a top plan view of the converter with a part removed, disclosing portions of the indicating device, Figs. 6 and 7 are, respectively, transverse sectional views of the converter taken on the lines 6—6 and 7—7 of Fig. 2, Fig. 8 is a central vertical sectional view showing the construction of the core of the transformer, and Fig. 9 is a view of a portion of the strip for making the transformer core.

The apparatus embodying my invention comprises a current converting means adapted to reduce the potential of the ordinary lighting circuit, say 110 volts, to the potential required for charging a battery, say 2, 4 or 6 volts, and in conjunction with such potential-reducing means, suitable means may be provided for carrying off or dissipating heat developed in the device. The potential-reducing means and the cooling means therefor are compactly arranged in a portable casing that may also carry the necessary terminals for connecting the converter to the electric current supply circuit and to the storage battery or other translating means. Where alternating current is utilized as the source of electric current, transformer means may be employed for reducing the potential, but it is, of course, necessary to rectify the alternating current before the same is supplied to the storage battery. The particular apparatus disclosed in the present application is one which is constructed so that it may utilize high-potential direct current or high-potential alternating current for charging purposes. It is advantageous, though not essential, in such devices, to employ a step-down electrical transformer, the primary winding of which may be utilized under both conditions, that is to say, both when the device is used as a direct current converting apparatus and also when the device is used as an alternating current converting apparatus. In the direct current application, the primary winding may be employed as non-inductive resistance. As a means for cooling the current-carrying, contact-making and heat-developing parts of the converter, an electric motor driven fan may be employed and so arranged as to cause a cooling draft of air through and about such parts. As a further means of economizing space and obtaining the advantage of the voltage drop through the motor windings, the latter may be employed as non-inductive resistance in the high-potential direct current supply circuit. For rectifying the alternating current, a vibratory rectifying means may be employed which utilizes the potential-reducing transformer and the alternations of the current and magnetic flux therein to alternately polarize and cause the vibration of a member to close the secondary circuit of the transformer at the proper instant. The vibratory rectifying means may be arranged to utilize every half-wave of the alternating current induced in such secondary circuit and thereby obtain direct current of the desired voltage for charging the storage battery or supplying current to a translating device. By thus combining the vibratory rectifier with the transformer, the parts of the converter may be compactly arranged and readily cooled and kept in operative condition. When high-potential direct or alternating current is utilized in the converting apparatus, suitable polarity indicating means may be provided to indicate the polarity of the delivery terminals of the converter. Additional resistance, where desired, may be connected in circuit, either in series or in parallel with the motor, and kept cool by the air circulated by the motor driven fan.

While converting apparatus is herein disclosed that is adapted for use on both direct current and alternating current high-potential supply circuits, it is to be understood that where a converting device is to be used only with direct current supply circuits, the rectifying device and other features peculiar to the alternating current adaptation of the converter may be dispensed with. Likewise, where the converter is to be employed only on alternating current high-potential supply circuits, the direct current supply terminals and non-inductive resistance may be omitted. It will be seen, therefore, that certain features of the invention as defined in some of the claims, are not necessarily limited to the combined direct current and alternating current converter herein disclosed.

Referring to the drawings, and considering first the features adapting the apparatus to convert high-potential alternating current to low-potential direct current, the electric current converter, as illustrated, comprises a potential-reducing transformer that is combined with a vibratory rectifier, which together operate to reduce the potential of the alternating current supplied to the device and rectify it into direct current of the proper voltage to be supplied to the storage battery or other translating device connected to the low-voltage direct current delivery terminals. The transformer T, as herein shown, comprises a primary winding 10 of relatively fine wire and a secondary winding 11 of heavier wire inductively associated with the primary winding. The primary winding 10 is connected by suitable conductors 12 and 13 to alternating current terminals Y, Y', and the secondary winding 11 is connected through a vibratory member V by suitable conductors 14, 14', 15 and 15'' to the low-voltage direct current terminals Z, Z'. The primary and secondary windings may be wound concentrically in inductive relation, forming a hollow cylindrical transformer winding and the relative number of turns and sizes of wire thereof is such that current of the proper amperage and voltage will be delivered to the battery B that is connected to the low-voltage terminals Z, Z', such current being rectified by a suitable rectifying device located in the secondary circuit.

The rectifying device may be of various types, the one herein employed being of the vibratory type arranged to close and open the secondary circuit at the proper instants to deliver only uni-directional or direct current at the terminals Z, Z'. The desirable form herein disclosed comprises a resilient vibratory member V fixed at one end and having contacts electrically connected in series circuit with the secondary winding 11. The vibratory member V is desirably disposed substantially in the axis of the transformer and carries a contact 16 intermediate its ends that cooperates with a contact 17 electrically connected to the conductor 15''. A permanent magnet P has its N and S poles disposed on opposite sides of the free end of the vibrator V and normally magnetically holds the latter in a position with its contact 16 out of engagement with the contact 17. The alternating flux set up in the transformer alternately oppositely polarizes the member V and induces N and S poles at the free end thereof, causing the latter to be alternately attracted and repelled by the adjacent poles of the permanent magnet P, thus vibrating the member V. During alternate half-waves of the alternating current, the contacts 16 and 17 will be closed, and the windings are so proportioned that the interval during which such contacts are closed will be of sufficient duration to permit the desired induced charging current to flow in the secondary circuit to the battery, such interval being determined by selecting a secondary voltage of proper value, as will be understood by those familiar with such devices.

Suitable means may be provided to carry away the heat developed in the transformer and for this purpose a fan F may be employed that is desirably driven by a universal electric motor M, connected by suitable conductors 18 and 19 to terminals 18' and 19' associated with the same connector carrying the main alternating current supply terminals Y, Y'. The terminals 18', 19' may or may not be independent of the terminals Y, Y', the arrangement being such that alternating current may be simultaneously supplied to the motor and to the transformer from the same alternating current supply mains, as for example, by inserting the terminals of a plug 21, such terminals being connected to alternating current supply mains and when inserted in the plug A, being adapted to supply relatively high-potential alternating current to both sets of wires or terminals connected respectively to the transformer T and the motor M.

The mechanism just described is capable of converting relatively high-voltage alternating current into relatively low-voltage direct current, and may be embodied in electrical current converting apparatus designed for use on alternating current circuits. Where it is desired to convert relatively high-voltage direct current into relatively low-voltage direct current, it is primarily necessary to insert sufficient resistance in the circuit between the supply and delivery terminals to reduce the direct current to the amperage and voltage desired. In order to compactly combine the electrical devices for use with either alternating current supply circuits or direct current supply circuits of relatively high-voltage, the winding of the motor employed to cool the transformer may be connected in series with the high-potential direct current supply circuit, and a part or all of the fine primary winding of the transformer T may be utilized as resistance, instead of employing a separate resistance coil. Of course, separate or additional resistance may also be employed in the combined apparatus, and the resistance and counter electromotive force of the motor M may be used without the resistance of the transformer primary winding to reduce the potential of the direct current supply circuit, where the converting apparatus is designed for use only with relatively high-potential direct current supply circuits.

As illustrated in Fig. 3, the terminals of the motor M are connected in series circuit with the low-voltage direct current delivery terminals Z, Z' and the battery B, by the conductors 22, 23, 14' and 15, conductors 22 and 15 being connected to the high-voltage direct current supply terminals X, X'. The resistance of the motor windings may be such that sufficient current may be supplied to the battery B to charge the same, but in utilizing a motor of the minimum size and thus reducing the weight of the converter, a sufficient amperage may not be obtained through the motor to charge the battery, and therefore an auxiliary electrical circuit may be provided in parallel with the motor windings to increase the current supplied to the battery. This auxiliary circuit may utilize the resistance of the primary winding 10 of the transformer, and an additional resistance R may or may not also be connected in circuit with the primary winding 10. The primary winding 10 and the resistance R may be connected in series with one another by a conductor 25 and a conductor 23' may connect the other end of the primary winding to the conductor 23 leading from the motor M. Normally, the circuit including the primary winding 10 and the resistance R is open at a switch S so that no current may flow therein when the primary winding acts as an element of the transformer T. A conductor 27 connected to the conductor 22 and to a spring contact 27', may be electrically connected to a conductor 26 that leads to the resistance R and the primary winding 10, by the operation of the switch S, which may be of any suitable construction. As illustrated, the switch S comprises two resilient conducting fingers 27' and 29 insulated from one another but operatively connected together by insulating material 30, maintaining the contact member 29 in engagement with a contact connected to the conductor 15' to electrically connect the conductors 15' and 15", the latter being electrically connected to the contact spring 29. The contact spring 27' is also normally held open and disconnected from the conductor 26, and the switch S may be operated in any suitable manner to open the circuits including the secondary winding 11, and to close the resistance circuit including the primary winding, when high-voltage direct current is supplied to the apparatus. In the arrangement illustrated, the short terminal 28' and the long terminal 28" carried by a plug 28 and connected to a high-voltage direct current supply circuit are arranged to be inserted in suitable sockets in the connector D, so that the terminals 28' and 28" will contact with the terminals X and X', and the longer terminal 28" will engage the insulation 30 to depress the spring 29 and 27', to open the circuit including the secondary winding 11 and electrically connect the conductors 27 and 26. High-voltage direct current is thus supplied to the electric motor M and to the resistance R and primary winding 10 in parallel therewith and low-voltage direct current of the proper amperage is then supplied to the battery B at the terminals Z, Z'. The operation of the motor M by alternating current or direct current, serves to drive a fan F and circulate air through and about the motor, the windings 10 and 11, the resistance R and the contacts 16 and 17, thereby keeping the current-carrying, sparking and heat-developing portions of the entire apparatus comparatively cool. Where the winding of the motor M is of the desired resistance, the parallel circuit need not be employed, and the conductors 23', 25, 26 and 27, as well as the resistance R and switch member 27' may be omitted, but the switch member 29 is retained so that the circuit including the secondary winding 11 may always be opened when the converter is employed with a high-potenial direct current supply circuit.

Suitable instrument means may be associated with the converting apparatus for indicating a characteristic of the current supplied thereby, as for example, to indicate the polarity of the low-voltage direct current terminals Z, Z', as illustrated at I in Fig. 3. The indicator comprises an electrical coil 31 in series circuit with the conductors 23, 14 and 14' and electrically connected by the latter to the low-voltage direct current delivery terminal Z'. A suitable electro-responsive indicating device associated with the coil 31 has a part arranged in the field of the permanent magnet P which normally maintains a pointer or other indicator thereon substantially in mid-position between the terminals Z and Z'. Such indicator is arranged to move to a position adjacent one or the other of the low-voltage direct current delivery terminals Z, Z', depending upon the direction of the current in the coil 31, thereby indicating which one of these delivery terminals is the positive terminal, for example.

As heretofore stated, the transformer windings are desirably wound concentrically to form a hollow cylindrical winding, and as illustrated in Fig. 2, for example, the primary winding 10 is desirably wound on the exterior of a hollow composite, fibre and metal spool 32 and the secondary winding 11 is wound on the outside of the primary winding. The metal spool 32 is provided with flanges 32' at the opposite ends thereof to which are secured annular fibre rings 32'' for confining the primary and secondary windings at the ends thereof and thereby forming a simple and compact transformer structure. The transformer just described fits snugly within a metal holder 33 having a bottom end or base 33' to which the lower ring 32'' of the spool 32 is secured by screws 33''.

The transformer also comprises a hollow substantially cylindrical core C disposed within the spool 32, and resting upon the base or holder 33. The core C, as best illustrated in Figs. 2, 8 and 9, may consist of a continuous strip 35 of suitable thin magnetically permeable material wound spirally to form a substantially cylindrical hollow roll. Along one of its edges, the strip 35 may be cut away at intervals, as shown, so as to leave laterally projecting portions 35' which, when the strip is rolled into a cylinder, provide oppositely disposed laminated poles on the upper end thereof. The laminated transformer core with its laminated poles is substantially the same length as the spool 32 and preferably fits tightly therein.

The space within the core serves as a compartment for a part of the rectifying device, its resilient vibrator V of magnetically permeable material being disposed substantially in the axis of the core and transformer and having its lower end fixed, as at 36', in a transversely extending portion 36 of the base 33. The upper end of the vibrator member V is free to move laterally and projects between the north and south poles of the permanent magnet P. The magnet P may be of any suitable construction but desirably consists of two similar stacks of substantially semi-annular laminations of magnetically permeable material placed side by side. The ends of the laminations have inwardly extending radial projections which form the north and south poles of the permanent magnet, are disposed between the projections formed by the extensions 35' of the core C and may be secured to the flanges 32' of the transformer spool 32 by clamps $p$. The permanent magnet is substantially the same exterior diameter as the transformer and is mounted upon the upper end thereof. The contact 16 carried by the vibrator V consists of a U-shaped spring member having a free outer end that is adapted to engage the contact 17 on the lower end of a contact strip 17', the upper end of which is secured to the upper ring 32'' and connected to the conductor 15''. The alternating flux produced by the transformer will polarize the vibrator V, alternately inducing north and south poles at the upper free end thereof which will be alternately attracted and repelled by the poles of the permanent magnet causing the vibration of the vibrator. The secondary circuit is thus opened and closed at the contacts 16 and 17, since the vibrator V and the strip 17' are connected in series with the secondary circuit of the transformer. Accordingly, during one-half wave of the alternating current, the contacts 16, 17 will be closed and during the next or negative half-wave, the contacts will be open. The interval during which the contacts are closed may be determined by features of design, the impressed primary voltage, the relative number of turns of the primary and secondary windings and the sizes of wire employed, and may be so determined as to keep the contacts 16, 17 closed for the period necessary to allow the desired flow of current to the battery to be charged.

As best shown in Fig. 6, substantially semicircular passages 36″ may be provided on opposite sides of the base 33′ to permit the circulation of cooling medium, such as air, through the transformer T and core C and past the vibrator V and the contacts 16 and 17. The circulation of such air may be effected by a fan F which may be mounted directly below these passages and on the upper end of the armature shaft m of the motor M. The armature shaft may be coaxial with the transformer and below the latter, being mounted in suitable upper and lower end brackets 40 and 41 of the motor frame.

The motor M is desirably one that is capable of operation from either direct current or alternating current electric circuits, being generally known as a universal type having a laminated armature core and a laminated field core. As illustrated, the field core of the motor comprises a stack 42 of punched laminations of permeable magnetic material cut away on opposite sides to leave poles 42′ having forwardly and rearwardly extending tips 42″, providing grooves to hold oppositely disposed field windings 43 in place on the laminated core. The end plates 40, 41 of the motor are spaced from the core 42 by suitable bushings 44 and 45, these bushings and the core being provided with registering holes to receive through screws 46 which are threaded into the upper end plate 40 and upper bushings 44 to clamp the motor assembly together and are also threaded into openings in the lower end of the holder 33 to suspend the motor and fan therefrom. The motor is provided with a suitable armature winding 47 wound on the laminated armature core 48, the winding being connected to a commutator 49 upon which the brushes bear.

The motor and transformer are desirably of substantially the same exterior diameter and are so assembled as to fit snugly into a suitable cylindrical sheet metal casing 51 which is desirably provided with openings for the admission and discharge of cooling medium, such as air. As illustrated, a series of openings 51′ is arranged in the bottom of the casing, the casing being mounted on suitable feet 52 to space it from a supporting surface. Another series of openings 51″ is provided near the upper end of the casing 51, the same being disposed at a point substantially opposite the permanent magnet, and suitable passageways being provided between the poles of the core C and through the space adjacent the permanent magnet on the upper side of the transformer through which the air may pass, other suitable passages being provided about the holder 33 communicating with the openings 51′ in the casing 51. Where additional resistance is employed, such as a resistance R, the same may be arranged in a suitable space, such as the space above the motor on a ring or holder R′ carried by the screws 46 and enclosing or adjacent the fan F, whereby the resistance will be effectively cooled. The arrangement of the air circulating system thus tends to keep the transformer, its core, the vibrator and its contacts, the motor and its cores and windings, and the resistance in a cool condition and thereby prevents undesirable and injurious overheating of any of the parts of the converter. In order to further reduce the possibility of heating parts of the apparatus, such as the brass casing 51, suitable slots 55 may be provided therein to provide ventilating openings as well as air gaps to impede the electrical current which may be induced therein.

The assembled transformer and motor may be mounted within the casing 51 in any suitable manner, and as herein illustrated, a cover 56 of insulating material is provided which may be secured, as by screws 57, to rods 331 threaded into the base 33, thus suspending the transformer and motor assembly in the casing from the cover and permitting the removal of the same by removing the cover. The cover is secured to the casing 51 by screws 56′ and has a flange 56″ which projects over the upper edge of the casing 51 to serve as an additional support. The current supply and delivery terminals may be mounted in any suitable position on the casing but are desirably carried by the cover. As illustrated, the low-voltage direct current delivery terminals Z, Z′, may be located on one side of the center of the cover, and the high-voltage supply connectors A and D, which receive the plugs 21 and 28 and are adapted to connect the high-voltage alternating current or the high-voltage direct current supply circuits to the apparatus, may be located on the opposite side of the center of the cover.

As previously stated, the cover may also carry a suitable instrument for indicating a characteristic of the current supplied to the low-voltage direct current delivery terminals. For example, when the converter is operating, it is desirable to provide means for indicating the polarity of the terminals Z, Z′, which may be mounted on the cover 56. As illustrated, the cover may be provided with a recess 60 which has a closure 61 secured to the cover by screws 61′. The closure 61 is provided with a curved window 62, the opposite ends of which terminate adjacent the terminals Z, Z′. A suitable pointer or other indicating device such as the flag 63, carrying a plus sign for example, is disposed in the recess 60 adjacent the window 62 so as to be visible therethrough. A supporting rod 64 carries the flag or indicator 63 and is provided with a needle or similar electrically responsive device 64', pivoted within a U-shaped frame 65 and in the magnetic field of the permanent magnet P, which through its action on the needle 64', maintains the indicator 63 in substantially mid-position with respect to the terminals Z, Z'. The coil 31 is also disposed in the recess 60 and adjacent to the needle 64' and arranged so that when current flows therethrough in one direction, the balanced condition of the needle will be disturbed by the attraction of the needle 64' by the magnet P whereupon the pointer or indicator 63 will be moved along the window to a position adjacent one of the terminals Z or Z'. Conversely, when current flows through the coil 31 in the opposite direction, the indicator 63 will be moved toward the other end of the window 62 and to a position adjacent the other low-voltage direct current delivery terminal. Accordingly, when the converter is in operation from a high-voltage electric current supply circuit, the polarity of the delivery terminals, Z, Z' will be clearly indicated, so that the proper electrical connections to the positive and negative terminals of the battery B may be made.

The operation of the apparatus will be understood from the drawing and the foregoing description but may be briefly described. For charging a storage battery from a source of relatively high-potential alternating current, the terminals of the connector 21, connected to a source of relatively high-potential alternating current supply, are inserted in the connector A, thereby impressing relatively high-potential alternating current on the primary winding of the transformer T and on the motor windings M. The alternations of the magnetic flux in the transformer core will induce a current in the secondary winding 11, and operate the vibratory member V, which closes the secondary circuit and supplies rectified or direct current on the proper voltage to the delivery terminals Z, Z' for charging the battery, the positive terminal of which has been properly connected as indicated by the indicator. At the same time the motor M will be operated to drive the fan F which circulates air through the apparatus to keep the same from overheating. The reversals of magnetism in the alternating magnetic field have substantially no demagnetizing effect on the permanent magnet P, because the alternating field set up in the transformer is substantially perpendicular to the fixed or uni-directional field set up by the permanent magnet. In the present arrangement, the vibrator V that may be tuned or adjusted approximately to the frequency of the alternating current supply may be placed substantially in the axis of the alternating field with a free end thereof projecting into the gap between the poles of the permanent magnet, such gap being of course also substantially in the axis of the alternating magnetic field.

For charging a storage battery from a source of relatively high-potential direct current, the longer terminal 28" of the plug 28 inserted into the connector D, serves to open the circuit of the secondary of the transformer at the switch S and thereafter may close the resistance circuit in parallel with the motor winding. The high-voltage direct current supplied to the terminals X, X', passes through the motor windings, which causes a reduction of the applied potential. Where additional resistance is connected in parallel with the motor winding, such as the resistance R or the primary winding 10, current will flow in parallel paths to the battery, and through the indicator coil 31. The polarity of the direct current delivery terminals Z, Z' is thereby indicated so that the positive and negative terminals of the battery to be charged may be properly connected. The motor M operates as a direct current motor to drive the fan F and cool the apparatus. Upon removal of the plug 28, the switch S will be restored automatically to adapt the apparatus for operation from an alternating current supply circuit.

While a desirable embodiment of the invention is herein illustrated and described in detail, it is to be understood that various features herein disclosed may be embodied in other types of electric current converters and numerous changes may be made in the construction and arrangement of the apparatus and the parts thereof without departing from the spirit of the invention and without sacrificing any of the advantages of the principles disclosed.

I claim:—

1. In a combined transformer and rectifier, the combination with a hollow transformer comprising concentrically disposed primary and secondary windings, of a vibrator having a magnetizable element at least partly disposed within said hollow transformer, contact means carried by said vibrator and connected in circuit with said secondary winding, and means for producing a uni-directional magnetic field and poles of opposite polarity adapted to cooperate with said vibrator.

2. A portable electric current converter comprising, in combination, a portable casing, high-potential direct and alternating current supply terminals on said casing, low-potential direct current delivery terminals on said casing, potential reducing means and an electric motor in said casing electrically connected to said direct and alternating current supply terminals, and a fan operable by said motor for circulating air through said casing.

3. A combined transformer and rectifier comprising an alternating current transformer having a hollow magnetizable core and windings thereon, a magnetizable vibrator substantially in the axis of said core, a contact carried by a part of said vibrator and in circuit with a winding of said transformer, and means for producing a uni-directional magnetic field in a plane perpendicular to the alternating magnetic field produced by said transformer and poles of opposite polarity cooperating with said vibrator.

4. In a combined transformer and rectifier, the combination with a transformer comprising a hollow laminated substantially cylindrical core and primary and secondary windings on said core, of a vibratory member of magnetic material fixed at one end and disposed substantially in the axis of said core, a permanent magnet having its poles disposed adjacent opposite sides of the free end of said vibratory member, a contact carried by said vibratory member and electrically connected to the secondary circuit of said transformer, and a fixed contact engageable by the contact on said vibratory member and electrically connected to the secondary circuit of said transformer.

5. A portable electric current converter comprising, in combination, electric converting means adapted to convert high-potential direct current and high-potential alternating current into low-potential direct current for charging a battery or the like, said converting means including an electric motor and its winding, a potential reducing electrical transformer adapted to produce an alternating magnetic field, means whereby high-potential direct current conductors may be electrically connected to said converting means, means whereby high-potential alternating current conductors may be electrically connected to said converting means, means whereby conductors may be electrically connected to the low-potential direct current delivery side of said converting means, a portable casing enclosing said converting means and motor, and means operable by said motor for circulating air through said casing.

6. An electric current converter comprising, in combination, a vibratory rectifier including a permanent magnet, an electrical coil in circuit with said rectifier, and electrically operable polarity indicating means comprising a movable indicator having an operating part thereof associated with said magnet and coil and normally held in a predetermined position by said magnet and adapted to be operated when current flows through said coil.

7. A transformer comprising a tubular laminated core consisting of a spirally wound sheet of magnetically permeable material having spaced lateral projections along one edge thereof adapted to provide oppositely disposed laminated poles on said core.

8. A magnetizable core for electrical apparatus comprising a body consisting of a spirally wound strip of magnetizable material having spaced lateral projections along one edge thereof.

9. An axially laminated magnetizable core for electrical apparatus comprising a spirally wound thin strip of magnetizable material having spaced integral portions projecting from one lateral edge of said strip.

10. In an electrical induction apparatus, the combination of a magnetizable core comprising a spirally wound thin strip of magnetizable material having spaced members projecting from one edge of said strip, and a winding on said core.

In testimony whereof, I affix my signature.

NEVIL MONROE HOPKINS.